May 19, 1931.  A. H. HEDLY  1,806,257
MACHINE FOR MAKING PRINTERS' LEADS, SLUGS, AND RULES
Original Filed March 30, 1929   7 Sheets-Sheet 2

Inventor:
Arthur H. Hedly,
By Dyrenforth, Lee, Chritton & Wiles
Attys.

May 19, 1931. A. H. HEDLY 1,806,257
MACHINE FOR MAKING PRINTERS' LEADS, SLUGS, AND RULES
Original Filed March 30, 1929 7 Sheets-Sheet 7

Inventor:
Arthur H. Hedly,
By Dyrenforth, Lee, Chritton & Wiles,
Attys.

Patented May 19, 1931

1,806,257

UNITED STATES PATENT OFFICE

ARTHUR H. HEDLY, OF CHICAGO, ILLINOIS, ASSIGNOR TO LUDLOW TYPOGRAPH COMPANY, OF CHICAGO, ILLINOIS, A CORPORATION OF ILLINOIS

MACHINE FOR MAKING PRINTERS' LEADS, SLUGS AND RULES

Original application filed March 30, 1929, Serial No. 351,369. Divided and this application filed February 21, 1930. Serial No. 430,315.

My invention relates more particularly to improvements in devices constituting elements of a machine for making, more especially, printers' leads, slugs and rules, particularly of the general type shown in United States Letters Patent No. 1,438,951 granted to Benjamin S. Elrod on December 19, 1922, this type of machine comprising generally stated a die to which the molten metal for forming a continuous strip is fed and in which the metal becomes set in strip form; feeding means engaging the strip projecting beyond the die for advancing the strip, the molten metal being fed into the die as the strip advances; means severing the strip into sections of the desired length; and means for stacking the strip sections; the primary idea in providing such machines being to provide for such economical production of articles of this kind formed of the same, or similar, metal of which type is made, that the entire printing form comprising the type, leads, slugs and rules may, without the requirement for separation of the leads, slugs, and rules from the type, be discarded, merely utilizing the metal of which the form elements are formed for new type, leads, slugs and rules; the present application being a division of my pending application for United States Letters Patent Serial No. 351,369, filed March 30, 1929.

My primary object is to provide a novel and positively operating construction of means for severing the strip into sections and for displacing such strip sections.

Referring to the accompanying drawings:

Figure 3ª is a section taken at the line 3ª on Fig. 3 and viewed in the direction of the arrow.

Figure 6ª is a reduced view in plan section taken at the line 6ª on Fig. 6 and viewed in the direction of the arrow.

The machine illustrated comprises, generally stated, means, represented generally at 25, for maintaining a body of molten metal from which the strips are to be formed, as for example and preferably type metal; die mechanism represented generally at 26 and to which the molten metal is supplied and in which the strip of the desired width and height, and either with or without a rule face, as desired, is formed; oil-feeding means, represented generally at 27, for feeding oil to the inner surfaces of the die to reduce the resistance to the drawing of the formed strip from the die and shown as of the same construction as that disclosed in my said copending application for patent; strip-feeding mechanism represented generally at 28 operating to intermittently engage the formed strip beyond the die and draw the strip through the latter; clamping means, represented generally at 29, for preventing retrograde movement of the strip in the idling movement of the feeding means to the point at which the strip-feeding operation begins; means, represented generally at 30, for severing the strip into sections of the desired length; and mechanism represented generally at 31 for automatically stacking the strip-sections.

The machine shown comprises a bed plate 32 supported on legs 33, and an end bracket-section 34, the various mechanisms above referred to being mounted upon this bed plate and bracket.

The mechanism 25 for maintaining a body of molten metal from which the strip is to be formed, comprises a crucible shown as formed of an outer casing-structure 35 mounted on the bed 32, open at its top, and having a bottom section 36; and a melting-pot proper 37, formed of refractory material located in the casing 35 and secured at its outwardly-extending surrounding flange portion 38 to the casing 35 in any desirable way, the side wall and bottom of the pot 37 being spaced from the casing as shown, in which space any suitable insulating material, as for example asbestos as represented at 39, is positioned.

The casing 35 contains an opening 40 into which a lateral extension 41 of the pot 37 extends, and forms a throat-portion, this throat-portion containing a channel 42 opening upwardly at a cylindrical portion 43 thereof through the bottom of the pot 37, substantially centrally thereof, the opposite end of this channel opening through the outer end of the throat-portion 41.

Superposed on the bottom of the pot 37 is a casting 44 of refractory material which presents an upwardly-extending cylindrical portion 45, the vertical opening in which is of the same size in cross section as the channel portion 43 and in direct vertical alinement therewith, the parts just referred to forming the cylinder portion of a pump hereinafter more fully described and which operates to force the molten metal out of the crucible to the die in which the strip is to be formed, the cylinder 45 containing passages 46 in its side wall through which the molten metal in the crucible enters this pump cylinder.

The member 44 is provided with a lateral extension 47 having at its outer end an upright cylinder portion 48, there being a passage 49 communicating at one end with the portion 43 of the channel 42 and opening through the side wall of the cylinder 48, this passage being controlled by valve mechanism hereinafter described.

The mechanism 25 also comprises a cover portion 50 for the crucible, preferably formed with a heat-insulating section, as represented at 51, this cover containing an opening controlled by a hinged closure 52 and through which opening the condition of the metal within the crucible may be observed and through which opening the metal may be charged into the crucible.

The die to which the molten metal passes from the crucible and which forms a portion of the mechanism 26 is represented at 53, this die being of substantially rectangular shape in cross-section and containing a die-opening 54 therethrough which at its outlet portion is of the same width and height as the strips to be formed therein, the bottom wall of this opening being so shaped as to cause the upper edge of the strip formed therein to be of the desired shape, namely, either flat, as for example where the strip is to be used in the making of leads and slugs, or of a shape to produce a rule printing surface, as in the case of rules.

Figures 1, 2:
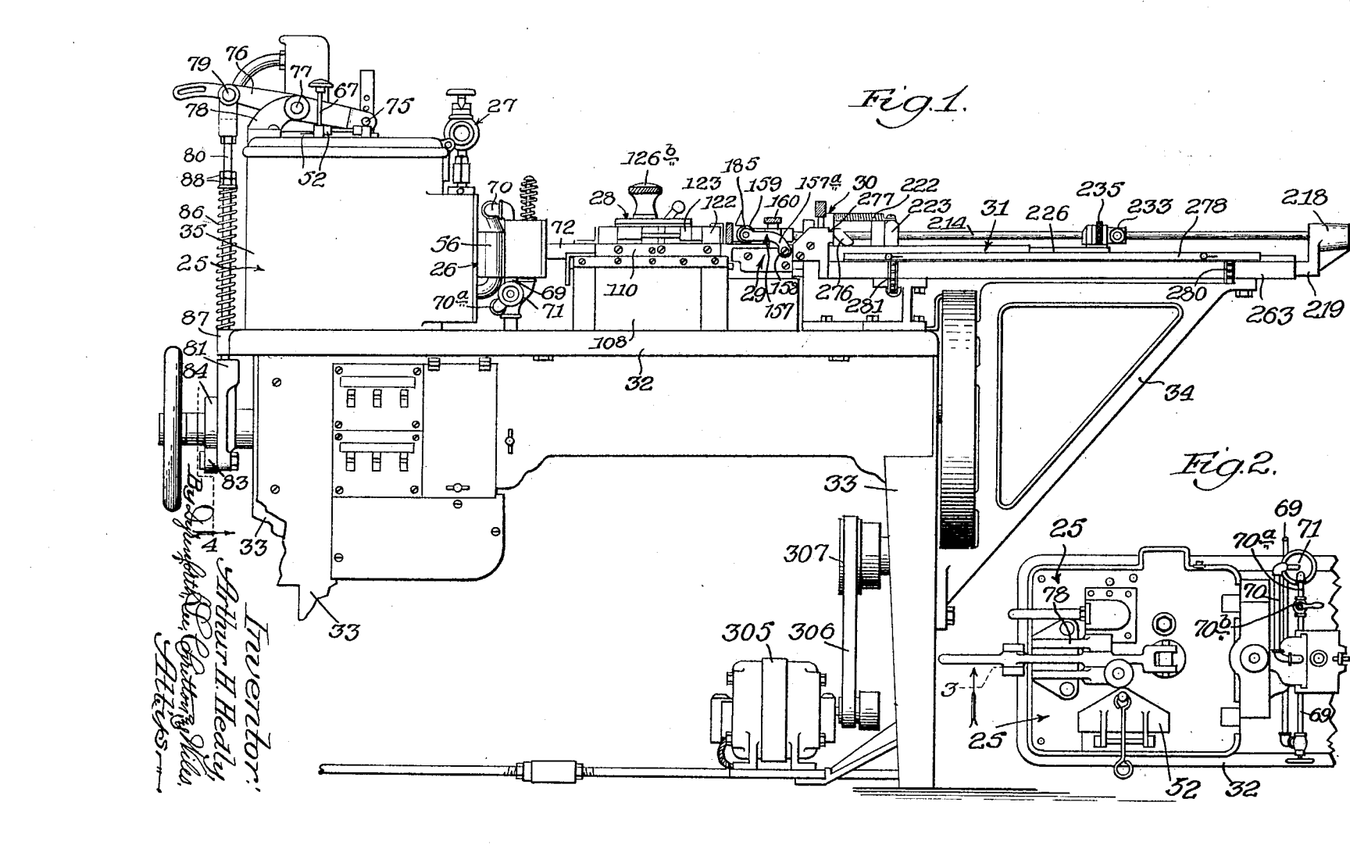
Figure 1 is a view in side elevation of a machine embodying my improvements.
Figure 2 is a plan view of the crucible-equipped end of the machine of Fig. 1.
Figures 3, 4:
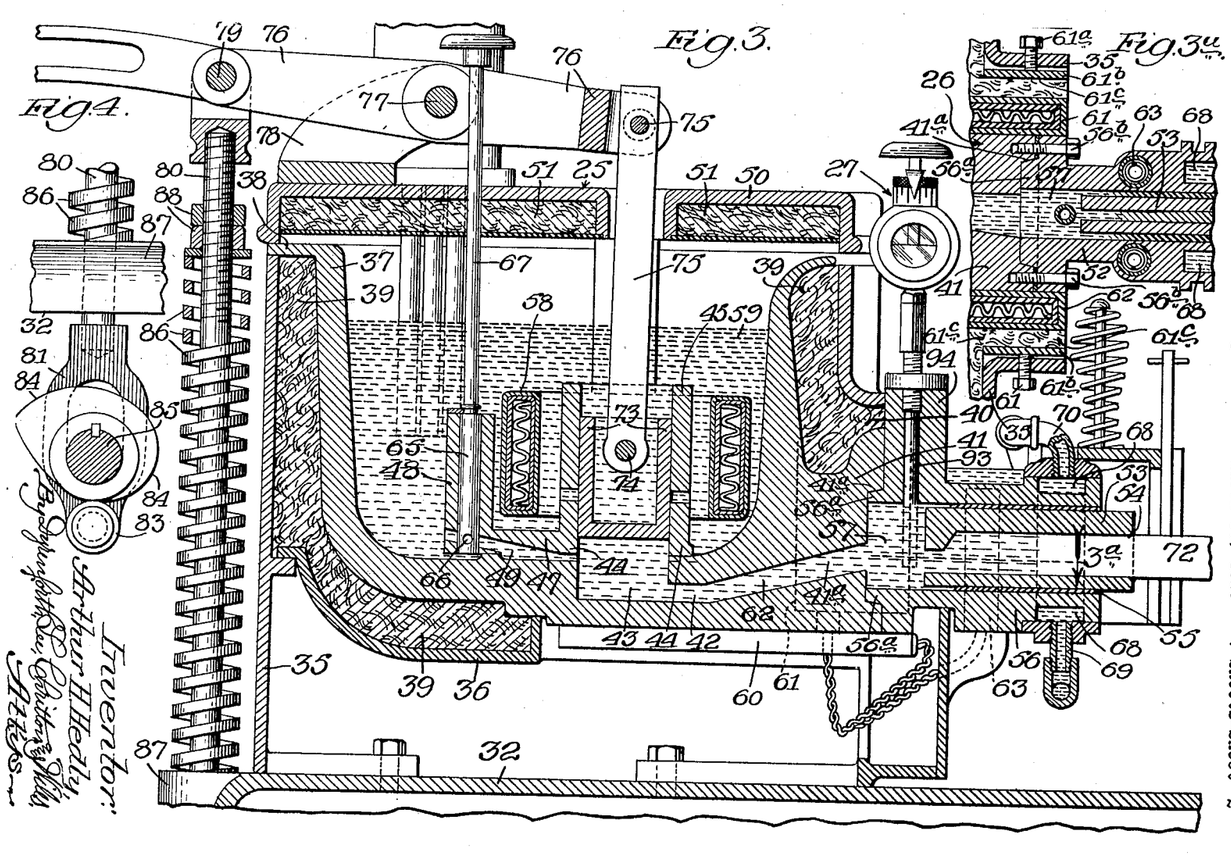
Figure 3 is an enlarged view in sectional elevation of the mechanism shown in Fig. 2, a portion of the means for operating the molten-metal pump being broken away.
Figure 4 is a view in elevation of a portion of the pump-operating means omitted in Fig. 3.

The die 53 is located in, and extends lengthwise of, an opening 55 extending through a housing 56 secured in the position shown (Fig. 3) to register at the inner end of the opening therethrough with the outer end of the channel 42, the die 53, the cross-sectional dimensions of which are less than those of the opening 55, reaching short of the crucible extension 41, whereby a chamber 57 is provided in the member 56 between the die 53 and the crucible-extension 41.

The outer face of the crucible-extension 41 contains an outwardly-flaring recess 41$^a$ into which the channel 42 opens, and into which a circular tapered boss 56$^a$ on the housing extends, to make a tight joint, the housing being secured in place by screws 56$^b$ extending therethrough and screwing into the extension 41.

The mechanism 25 also comprises heating means for maintaining the metal in the crucible 37 and in the throat-portion thereof and in the inlet portion of the die 53, in molten condition, the means for this purpose comprising an electrical heating unit 58, in the form of an annulus, immersed in the body 59 of the metal in the crucible and surrounding the cylinder 45; an electrical heating unit 60 located at the bottom of the crucible and extending lengthwise along the channel 42; a pair of electrical heating units 61 and 62 positioned at the throat-portion of the crucible at opposite sides of the outlet end of the channel 42; a pair of electrical heating units 63 and 64 located in the housing 56 at opposite sides of the opening 54 and between the forward extremity of the crucible extension 41 and the forward, or outlet, end of the die 53, the supplying of current to these several heating elements being controlled in any desirable way, as for example as disclosed in my said co-pending application for patent.

As will be understood, the provision of the heating elements 58, 60, 61, and 62, is to ensure the maintenance of the metal in fluid condition up to a point where it is caused to become set in the die 53 by the subjection of the metal to cooling means, as hereinafter described.

The bottom heating unit 60 of rectangular plate-like form is secured, in any suitable way, flatwise against the underside of the throat-portion of the crucible and the flat underside of the housing 56; and the heating units 61 and 62 of the same form as the unit 60 fit flatwise against opposite sides of the throat-portion of the crucible and the adjacent sides of the housing 56, the units 61 and 62 being held in place by clamp-screws 61$^a$ threaded in the casing 35 and bearing against plates 61$^b$ between which and the units 61 and 62 insulating material 61$^c$, such as asbestos, is interposed.

It may be here stated that the die 53 is sealed in the housing 56 by metal supplied from the crucible 37 and to this end the passage 49 is provided whereby molten metal from the crucible flows through this passage and thence through the channel 42 into the space around the die 53, the heating elements 63 and 64 in this operation being energized to heat the housing 56 to such a temperature that the metal supplied thereto is maintained in molten condition and completely fills the space around the die 53, whereupon the elements 63 and 64 are deenergized and the metal around the die 53 solidifies, sealing the latter in place.

The passage 49 contains a rotary valve 65 of cylindrical form located, and rotatable, in the cylinder 48 and having a cross port 66 which, when the valve is in one position, forms a part of the passage 49 but when rotated to a different position, closes this passage, the valve 65 having an upwardly extending stem 67 by which it may be rotated.

It will be understood that the heating elements 63 and 64 also serve as means, when energized, to melt the sealing metal around the die 53 to permit of the removal of the latter when desired.

In the forming of the strip, the metal supplied to the die 53 is caused to solidify adjacent the outlet end of the die passage 54, and as a means for effecting this result, the housing 56 is provided with a channel 68 which surrounds the die 53 and through which cooling water is circulated, the arrangement shown for thus circulating water comprising a pipe 69 which leads from any suitable source of supply of cooling water and opens into the bottom of the channel 68, this channel communicating at its upper end with an outlet pipe 70 discharging into a drain 71. The cooling water entering the bottom of the channel 68 divides and flows upwardly through opposite sides of the channel 68 and discharges through the outlet 70.

It is desired that during the energizing of the sealing units 63 and 64, flow of cooling water to channel 68 be discontinued and this channel drained, the latter being effected through a pipe 70$^a$ valved at 70$^b$ and leading from the bottom of channel 68 into the drain 71.

As hereinbefore stated, the feeding of the molded strip, represented at 72, out of the die 53 is effected by pulling force applied thereto beyond the die 53, this feed being intermittent. In order that the strip be formed of a continuous length, the molten metal must be caused to flow into the die-channel in the die 53 in sufficient volume to maintain the same completely filled at all times. This is provided for in the machine shown by the pump hereinbefore referred to and provided in the crucible 37, this pump comprising the cylinder 45 and a piston 73 reciprocable therein and pivotally connected at 74 with the lower end of a link, the upper end of which is pivotally connected at 75 with one end of a rock arm 76 journalled at 77 on a bracket arm 78 on the cover 50, the other end of the arm 76 being pivotally connected at 79 with the upper end of a rod 80, the lower end of which is connected with a head 81 slotted at 82 and carrying a roller 83 at its lower end, this roller cooperating with a cam 84 rigidly connected with a shaft 85 and constituting the main shaft of the machine, this shaft extending longitudinally of the machine below the bed 32 and being journalled in suitable bearings on the machine frame. The roller 83 is normally held at all times against the periphery of the cam 84 by a coil spring 86 surrounding the rod 80 and confined between a stationary member 87 on the frame of the machine and through an opening in which the rod 86 is reciprocable, and stop means 88 carried on the upper end of the rod 80, the piston 73 thus being operated on its power stroke by the spring 86.

The parts of the machine are so proportioned and arranged, as hereinafter described, that during the movement of the strip-feeding mechanism toward the die 53 for positioning this mechanism preliminary to the feeding of the strip from the die, the piston 73 rises uncovering the openings 46 and permitting molten metal to flow into the cylinder 45 and during the feeding of the strip by the strip-feeding mechanism the piston 73 is forced downwardly to force the molten metal through the channel 42 and into the die-channel 54.

Referring now to the details of the illustrated strip-feeding mechanism 28, this mechanism comprises a base 108, in the form of a housing stationarily mounted on the bed 32 and containing in its upper portion a dovetail slot 109 extending longitudinally thereof. Mounted on the top of the member 108 is a slide 110 having a depending dovetail portion 111 interfitting with the walls of the dovetail slot 109, this slide being reciprocable on the member 108 lengthwise of the machine and parallel with the longitudinal axis of the latter. The upper surface of the slide 110 contains a recess 112, the form of this recess being such, as shown, that one of its side walls, represented at 113, extends parallel with the longitudinal axis of the machine and its opposite side wall, represented at 114, inclines toward the right-hand end of the machine in Fig. 5 away from this axis. The wall 113 is lined with a bar 115 of uniform width faced by a filler bar 116 likewise of uniform width, and the wall 114 is faced by a bar 117 of uniform width with its inner upper edge portion beveled as represented at 118. The slide 110 is thus formed in its upper surface with an effective recess defined by the opposing surfaces of the members 117 and 116, one side of which is parallel with the longitudinal axis of the machine and substantially coincident with the adjacent face of the formed strip 72, as shown in Figs. 5 and 6, and the other side of which is spaced from the strip 72 and inclines toward the right-hand end of the machine in Fig. 5 in a direction away from this strip.

The mechanism now being described also comprises a plate member 119 having a lateral extension 120 at which the plate 119 is hingedly connected with a shaft 121 supported at its ends in spaced-apart blocks 122 rising from, and secured to, the slide 110, the shaft 121 extending parallel with the inclined inner face of the member 117. The plate member 119 is thus adapted to be swung at its hinge connection with the slide 110 into and out of the position shown in Figs. 5 and 6.

In order that the strip-feeding mechanism, the further details of which are hereinafter described, may be adapted for the feeding of formed strips of different widths, the plate member 119 is slidable at its extension 120 along the angularly disposed shaft 121, the plate 119 being held in any desired position of adjustment along this shaft by gage-blocks 123 pivotally mounted on a rod 124 secured at its ends in the supporting blocks 122 and extending parallel with the shaft 121, these blocks being provided with finger portions 123ᵃ at which they are adapted to extend between the extension 120 of the plate 119 and the adjacent supporting blocks 122. The gage-blocks are independently rotatable into and out of the position just stated, the dotted lines shown in Fig. 8 representing the position to which the blocks may be turned and thus the plate 119 may be adjusted to any desired position along the shaft 121 and the gage-blocks then turned back to a position for holding the plate 119 in the adjusted position. The gage blocks 123 are of graduated widths as shown and bear legends indicating the positions to which the plate 119 should be adjusted along the shaft 121 to correspond with different widths of strip 72 to be operated on. Thus, in the drawings, the plate 119 is adjusted to a position for feeding twelve pica strips. If, by way of example, eighteen pica strips are to be fed, the gage blocks 123 with the indication "18" thereon should be turned back, the plate 119 adjusted to the right in Fig. 5 and this particular gage block positioned between the extension 120 and the one of the gage blocks 123 designated "12", it being noted that by adjusting the plate member 119 to the right in Fig. 5, it is bodily shifted in a direction away from the strip 72 and when adjusted to the left in this figure, is bodily moved in a direction toward this strip.

Figure 5:
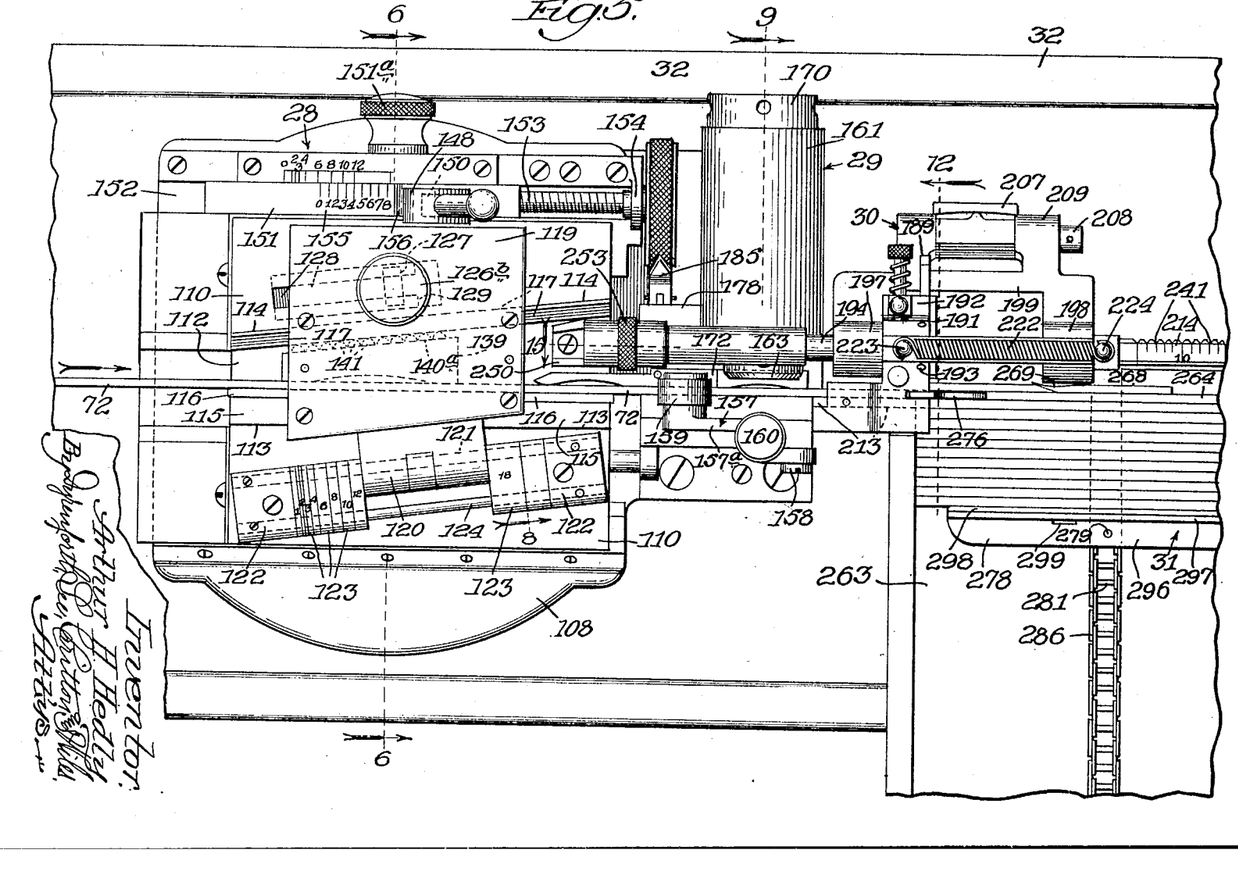
Figure 5 is a plan view of the mechanism which operates on the molded strip and comprising feeding means for the strip, clamping means for the strip, means for severing the strip into sections of the desired length, and means for stacking the strip-sections, the latter means being shown partly broken away.
Figures 6, 6A, 7, 8:
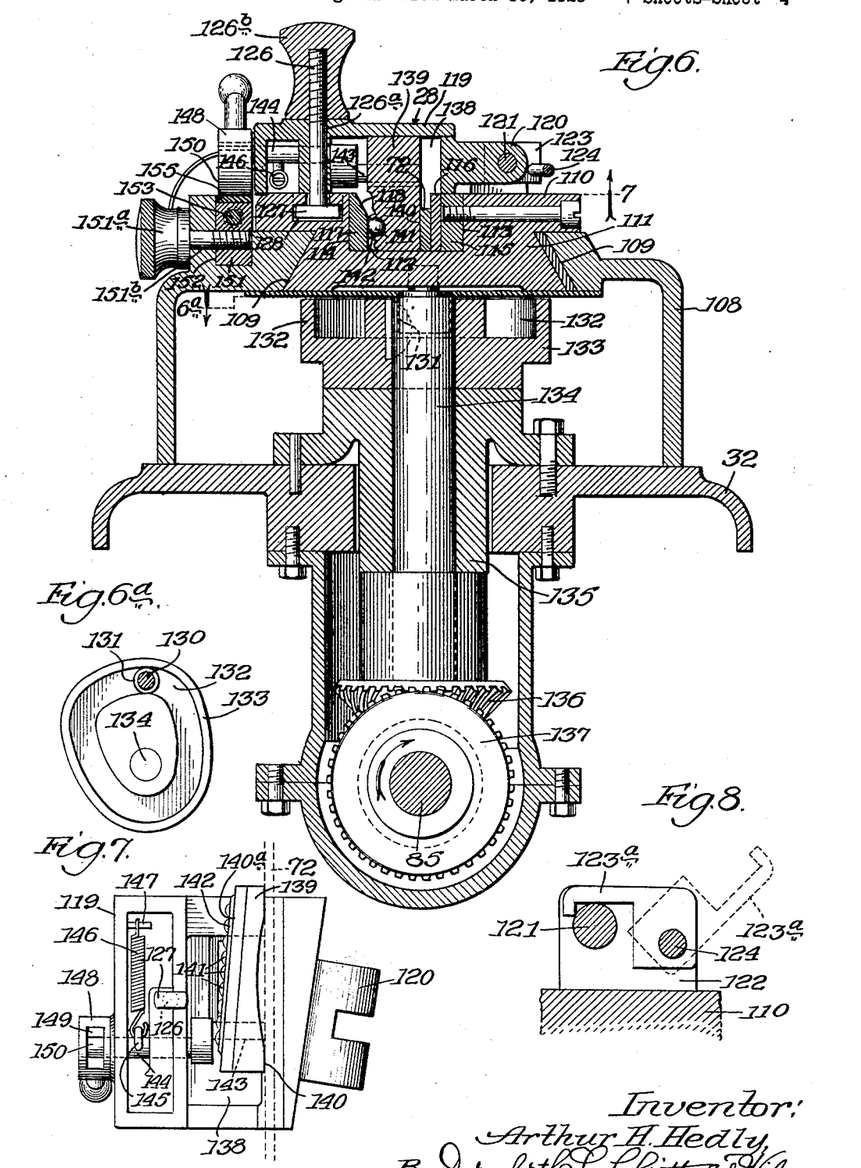
Figure 6 is a section taken at the line 6—6 on Fig. 5 and viewed in the direction of the arrows, this section being taken at the strip-feeding mechanism.
Figure 7 is a bottom plan section taken at the line 7 on Fig. 6 and viewed in the direction of the arrow.
Figure 8 is a section taken at the line 8 on Fig. 5 and viewed in the direction of the arrow.

The plate 119 is held against upward displacement from the position shown in Figs. 5 and 6, by a lock-bolt 126 vertically movable in an opening 126ᵃ in the plate 119, its upper threaded end being engaged by a nut 126ᵇ. The lower headed end 127 of the lock-bolt extends into a slot 128 in the slide 110 of T-shape in cross section (Fig. 6), this slot being enlarged at one end, as indicated at 129, which permits the plate 119 to be swung on its hinge when this plate is moved along the shaft 121 to a position in which the head 127 of the bolt 126 registers with the enlargement 129.

The slide 110, together with the parts carried thereby, is reciprocated by means of a pin 130 depending from the slide and provided with a roller 131 which extends into the continuous cam groove 132 of a cam 133 mounted on the upper end of a shaft 134 journaled in a bearing 135 on the base plate 32, this shaft being driven by a bevel pinion 136 meshing with a bevel pinion 137 on the shaft 85.

Located in a recess 138 in the member 119 and extending into the recess 112 in the body portion of the slide 110 is a wedge block 139 between the side 140 of which and the liner strip 116, the strip 72 extends (Figs. 6 and 7), the opposite side of the block 139 being inclined, as represented at 140ª, at which portion it is provided with a series of ball-bearings 141 held in spaced relation to each other by a cage 142, these balls opposing the inclined inner face of the liner strip 117 as shown in Fig. 6.

The wedge block 139 is loosely engaged by a crank pin 143 on a shaft 144 extending crosswise of, and journaled in, the member 119, the shaft 144 having a radially-extending pin 145 connected with one end of a coil spring 146, the opposite end of which is connected with a pin 147 stationary on the member 119, the arrangement of these parts being such that the spring tends to rotate the shaft 144 in a direction to force the wedge-block 139 to the left in Fig. 5, namely, into wedging position against the strip 72. The outer end of the shaft 144 has rigid thereon a cylindrical head 148 containing a recess 149 in the lower portion of its periphery in which a roller 150 is journaled to partly project beyond the periphery of the head 148, this roller, in the position of the parts shown in Fig. 5 being shown as substantially vertically alined with the axis of the shaft 144.

On the stationary member 108, directly below the path of movement of the head 148, is a bar 151 adjustable longitudinally of the machine in a groove 152 in the upper side of the member 108, this bar being adjusted by means comprising a shaft 153 journaled at 154 on the member 108 and held against lengthwise movement and having threaded engagement at its inner end with the adjacent end of the bar 151. A clamp screw 151ª screwing at its end into the bar 151 and extending into a slot 151ᵇ in the member 108 affords means for maintaining the bar 151 against accidental displacement.

The bar 151 is provided on its upper surface, at one end, with a raised portion 155 having an incline 156, the portion 155 being at such an elevation that in the movement of the slide 110 to the left in Fig. 5, the roller 150 engages the incline 156 and rides upon the portion 155 with the result of rotating the shaft 144 in a direction to shift the wedge-block 140 toward the right in Fig. 5, thereby overcoming the tendency of the spring to force the wedge-block into wedging engagement with the strip 72. The parts just described remain in the relative positions stated until the roller 150, in the movement of the slide 119 to the right in Fig. 5, moves beyond the raised portion 155, whereupon the spring 146 becomes effective to exert yielding pressure on the wedge block 140 tending to shift it to the left in Fig. 5 which results in the firm gripping of the strip 72 between the wedge-block and the liner strip 116 for effecting the feeding of the strip 72.

It will be understood by adjusting the bar 151 lengthwise of the machine, the length of the feed stroke may be increased or diminished as desired, this being of advantage in that, in general, the thicker the molded strip to be formed, the shorter the feed stroke should be.

Located to the right in Fig. 5 of the feed mechanism 28 is a presser-device 157 in the form of a lever 157ª fulcrumed at one end, as represented at 158, to a stationary part of the machine and equipped at its other end with a roller 159 held down against the upper edge of the strip 72 by a screw 160 freely rotatable in the lever 157ª and screwing at its lower end into the stationary part to which the lever 157ª is pivoted, a compression spring 160ª holding the lever 157ª against the underside of the head of the screw.

Figures 9, 10, 11:
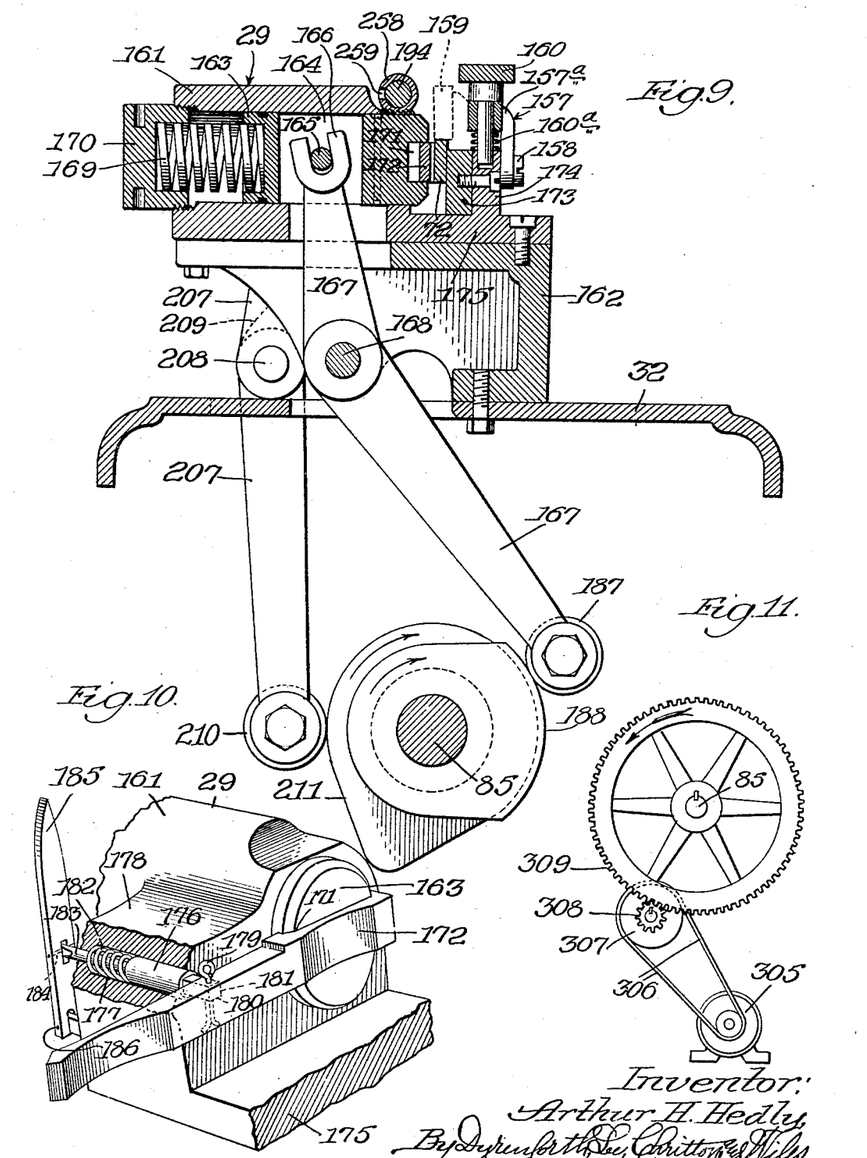
Figure 9 is a section taken at the line 9 on Fig. 5 and viewed in the direction of the arrow.
Figure 10 is a broken perspective view of a detail of the mechanism for clamping the strip against retrograde movement in the operation of the strip-feeding mechanism.
Figure 11 is a view in end elevation of the main drive shaft of the machine and the mechanism by which it is driven.

The mechanism 29 for clamping the molded strip 72 against retrograde movement in the movement of the slide 110 to the left in Fig. 5 comprises a cylinder 161 mounted on, and rigidly secured to, a bracket 162 secured to the bed plate 32, this cylinder containing a piston 163 slotted between its ends at 164 and containing a cross pin 165 which is straddled by the upper forked end 166 of a lever 167 which extends upwardly into the slot 164 and is fulcrumed at 168 on a stationary part of the machine. The piston 163 is backed by a coil spring 169 located in the end of the cylinder 161 and interposed between the piston 163 and an adjustable stop-plug 170 screwed into this end of the cylinder. The opposite end of the piston 163 contains a horizontally extending slot 171 into which a horizontally extending clamp bar 172 extends freely, this bar being located alongside of the molded strip 72 and operating when the piston 163 is moved to the right in Fig. 9 to clamp the strip 72 against a stationary bar 173 secured to an upstanding flange 174 on an extension 175 of the cylinder 161.

The clamp bar 172 at the portion thereof to the left in Fig. 5 of the cylinder 161, is connected with a spring-pressed plunger 176 mounted in a socket 177 in an extension 178 of the cylinder 161 which operates not only to prevent lengthwise shifting of the bar 172, but also causes the left-hand end of this bar in Fig. 5 to press relatively lightly against a side of the molded strip 72. The connection between the plunger 176 and the bar 172 comprises a pin 179 passing through the bar 172 and through the outer end 180 of the plunger 176 which is set into a recess 181 in the side of the bar 172. The spring for pressing the plunger toward the bar is represented at 182. It surrounds a stem 183 of the plunger and is confined between the plunger and the end wall of the recess 177. The stem 183 projects outwardly beyond the cylinder extension 178 where it is pivotally connected at 184 to a manually operated lever 185 fulcrumed at its lower end, as indicated at 186, to the extension 178.

The mechanism for operating the piston 163 to clamp the formed strip 72 during the movement of the slide 110 to the left in Fig. 5 comprises the lever 167 above referred to, the lower end of which is provided with a roller 187 and a cam 188 rigidly secured to the main shaft 85 and against which the roller 187 bears continuously.

Referring now to the mechanism 30 for severing the formed strip 72 into strip-sections of the desired length, this mechanism comprises a knife 189 reciprocably mounted in a recess 190 having a cover-plate 191, in a block 192 rigidly connected by a pin 193 with a rod 194 between the ends of the latter. The rod 194 is reciprocable in alined openings 195 and 196 in spaced-apart uprights 197 and 198 on a stationary bracket member 199 secured to the bed 32 of the machine. The block 192 contains an opening 200 therethrough at which it is slidable on a stationary guide rod 201 secured at its opposite ends in the uprights 197 and 198 and parallel with the reciprocable rod 194.

Figure 12:
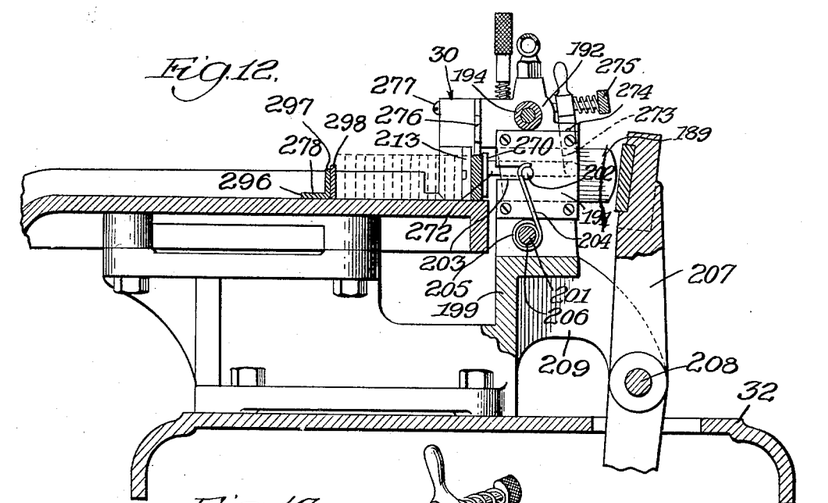
Figure 12 is a section taken at the line 12 on Fig. 5 and viewed in the direction of the arrow, the section being taken at the strip-cutting mechanism.

The knife 189 is provided with a laterally extending pin 202 projecting through a slot 203 in the cover plate 191 and engaged by one end 204 of a tension spring 205 encircling, at its coil portion, a hub 206 on the block 192 and surrounding the rod 201, this spring yieldingly holding the knife 189 in the retracted position shown in Fig. 12.

The knife 189 is actuated by a lever 207 fulcrumed at 208 on an extension 209 of the stationary member 199, the lower end of this arm carrying a roller 210 engaging at its periphery with a cam 211 rigidly secured to the drive shaft 85.

The block 192 is normally in a position, as shown in Fig. 5, in which the knife 189 carried thereby extends to the left in this figure out of the path of movement of the upper end of the lever 207, the knife being positioned for operation by the lever 207, only when the formed strip 72 projects to the right in Fig. 5 beyond the knife edge 212 of a stationary plate 213, a distance equal to the length of the strip-section to be produced, at which time the formed strip 72 is at rest.

The mechanism for thus shifting the cutter-equipped block 192 and which is actuated by the formed strip 72 comprises a rod 214 having at one end a portion of reduced diameter, as represented at 215, at which it slidingly extends into a socket 216 in one end of the rod 194, the other end of the rod 214 being slidably mounted in a socket 217 in a lug 218 on a plate member 219 connected at one end with the bracket member 199 and at its other end with the frame bracket 34, the rod 214 being backed by a coil spring 220 located in the socket 217 and interposed between this rod and a plug 221 at the end of the socket 217.

Figures 15, 16, 17, 18, 19, 20, 21, 22:
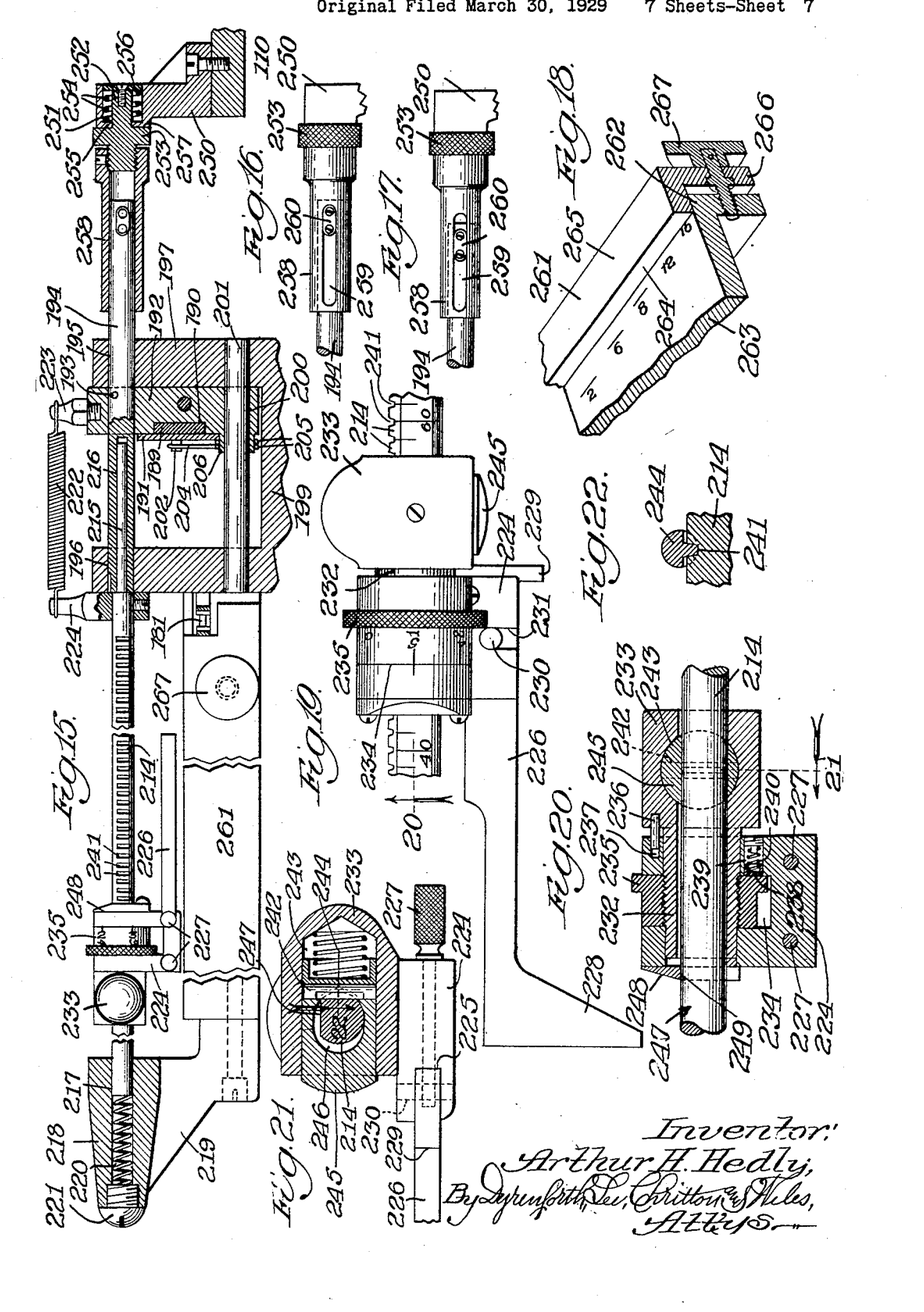
Figure 15 is a section taken at the line 15 on Fig. 5 and viewed in the direction of the arrow showing certain details of the mechanism for gaging the length of the strip-sections produced by the machine.
Figure 16 is a broken view in side elevation of a detail of the mechanism of Fig. 15 showing the illustrated parts in one position they assume.
Fig. 17 is a similar view showing the parts illustrated in Fig. 16 in a different position assumed thereby.
Figure 18 is a broken perspective view, showing the illustrated parts in section, of a detail of guide mechanism for the strip.
Figure 19 is a broken plan view of gaging mechanism forming a portion of the mechanism of Fig. 15.
Figure 20 is a broken sectional view in elevation taken at the line 20 on Fig. 19 and viewed in the direction of the arrow.
Figure 21 is a section taken at the line 21 on Fig. 20 and viewed in the direction of the arrow.
Figure 22, a sectional view of a detail of certain of the mechanism shown in Fig. 21, the section being taken at the line 22 on Fig. 21 with certain parts omitted and one of the illustrated parts shown partly broken away.

The rods 194 and 214 are connected together by a coil spring 222, the opposite ends of which are attached, respectively, to a post 223 on the block 192 and a collar 224 rigid on the rod 214, the block 192 being shifted into a position for actuation of its cutter 189 by the lever 207, by the pull exerted thereon through the spring 222 when the rod 214 is moved to the left in Fig. 15.

The rod 214 is equipped with a device which extends into the path of movement of the terminal end of the formed strip 72 and which is moved to the left in Fig. 15, together with the rod 214, in the continuing movement of the formed strip 72, the device referred to being adjustable into different positions lengthwise of the rod 214 to provide for the cutting of the formed strip into strip-sections of any desired length.

The device just referred to comprises a block 224 loosely surrounding, and movable along, the rod 214 and containing a recess 225 into which a tappet-bar 226 extends between its ends, this bar being secured to the block 224 by screws 227, the bar 226 extending lengthwise of, and parallel with, the rod 214. The bar 226 is provided at opposite ends with lugs 228 and 229 and adjacent the lug 229 with a cross pin 230 which extends into vertically alined recesses 231 in the upper and lower walls of the recess 225, this pin serving to properly position the bar 226 in the block 224.

The bar 226 is provided for engagement by the terminal end of the formed strip 72 and is reversible end for end in the block 224 to present either lug 228 or 229 to the strip 72, depending on the length of the strip sections to be provided, the bar 226 being positioned reversely to the position shown in the drawings when it is desired to produce very short strip sections.

The block 224 is associated with a sleeve member 232 surrounding, and slidable along, the rod 214 and extending at one end into the space between the block 224 and the rod 214 and having a head 233 at its opposite end beyond the block 224, the block 224 and sleeve member 232 being relatively movable in a direction lengthwise of the rod 214.

The block 224 contains a recess 234 into which a nut 235, threaded on the sleeve member 232, is located and by the rotation of which the block 224 may be moved lengthwise relative to the sleeve member 232, this block and sleeve being held against relative rotary movement by a pin 236 on the head 233 which slidingly extends into a recess 237 in the block 224. To prevent accidental rotation of the nut 235, a shoe 238 slidable in a recess 239 in the block 224 and pressed against a face of the nut 235 by a spring 240, is provided.

The rod 214 is provided along a side thereof with a series of notches 241 with which a pawl 242 on the head 233 of sleeve member 232 engages for locking this sleeve member in adjusted position along the rod 214. The pawl 242 is slidably mounted in a socket 243 in the head 233 and is backed by a spring 244 which urges the pawl toward the notched side of the rod 214. Slidable in the outer end of the socket 243 is a plunger 245 which, at an opening 246 therein, freely surrounds the rod 214 and opposes the pawl 242 and by which the latter may be pressed, against the action of the spring 244, out of engagement with the notched portion of the rod 214 to permit the sleeve member 232, together with the block 224 and the tappet-bar 226, to be freely slid together along the rod 214, the nut 235 threaded upon the sleeve 232 as stated, and engaging the block 224, furnishing a means by which a very accurate, or fine, adjustment of the bar 226 along the rod 214 may be effected.

To prevent rotation of the block 224 and the parts carried thereby, the upper surface of the rod 214 is made flat, as represented at 247, and the block 224 is provided with a plate 248 which straddles the rod 214 and has a flat surface 249 extending closely adjacent the flat surface 247 of the rod 214.

It will be understood from the foregoing that in the feeding of the formed strip 72 to the right in Fig. 5 and to the left in Fig. 15, the terminal end thereof engages the end of the tappet-bar 226 opposing it, thereby shifting this bar and with it the rod 214 and, through the spring connection 222, the block 192 and rod 194, which causes the knife 189 to extend into the path of movement of the lever 207 in the rocking of the latter which occurs only when the strip 72 is at rest, the strip thus being severed into a strip section of a length gaged by the setting of the tappet-bar 226 along the rod 214 by the mechanism above described.

The return of the cutter-equipped block 192 to the normal position shown in Fig. 15 is provided for primarily by a direct mechanical connection with a positively driven part of the machine, as for example and preferably the slide 110, though the spring 220, through the abutment of the rod 214 with the rod 194 exerts force, urging the block 192 to the normal position stated.

The mechanical connection shown comprises a bracket 250 connected with, and rising from, the slide 110 and containing an opening 251 in which the shank 252 of a screw-device 253 is slidably movable, a coil spring 254, surrounding the shank 252 and confined between a flange 255 on the upright and a disk 256 on the shank, yieldingly holding the device 253 at a shoulder 257 thereon against the upright 250. The other end of the screw-device 253 is screwed into a tube 258, containing a slot 259 extending longitudinally thereof, and telescoping with the adjacent end of the rod 194, the latter having a projection 260 at its side which slidingly extends into the slot 259.

In the normal position of the mechanism shown in Fig. 15, namely, the position in which the cutter device 189 extends out of the path of movement of the lever 207, the slide 110 may reciprocate without affecting the position of the cutter-equipped block 192, but the arrangement of the various parts described is such that the movement of the slide 110 to the left in Fig. 5 following the shifting of the block 192 and the rod 194 to the left in Fig. 15 and the concluding of the strip cutting operation, causes the left-hand end wall of the slot 259 (viewing the slot in Figs. 15, 16 and 17) to engage the projection 260 on the rod 194, in the final movement of the slide 110 to the left in Fig. 5, thereby positively ensuring the returning of the block 192 to normal position (Fig. 15) in which the cutter 189 is out of the path of movement of the actuating lever 207. The spring connection between the screw-device 253 and the upright 250 is provided primarily as shock-absorbing, or cushioning, means, the spring connection 222 operating to prevent damage to the operating mechanism in case any obstruction to the movement of the block 192 to normal position is presented.

To the right in Fig. 5 beyond the cutter 189 is a guide bar 261 for the mold strip 72, this bar being of angle shape in cross section and fitting over the upper corner edge 262 of a table portion 263 secured to the brackets 199 and 34. The inner edge 264 of the upper flange 265 of the bar 261 flatwise opposes the molded strip 72 and its depending flange 266 carries spaced-apart adjusting screws 267 (one only of which is shown) which are rotatable in the flange 266 and are held against lengthwise movement therein, these screws bearing at their inner ends against the adjacent edge of the table top 262. By adjusting these screws the bar 261 may be adjusted for formed strips of different widths, the table top being shown as provided with markings to guide the operator in adjusting this bar. The left-hand end, in Fig. 5, of the bar 261, is preferably provided with a finger 268 having a receding surface 269 which ensures the proper guiding of the end of the formed strip 72 into a position in which it moves along the side 264 of this bar.

In order that the cutter 189 effect clean severance of the strip 72, the block 192 is provided with the plate 213 presenting a knife edge 212 which backs the formed strip at the line of severance.

The molded strip 72 should press firmly against the stationary cutter plate 213 at the beginning of the cutting operation and to ensure this condition a presser-plate 270 is provided opposite the stationary cutter plate 213, the plate 270, which has an outwardly deflected strip-guiding end-portion 271, being connected with one end of a pin 272 slidable in the block 192, this pin being pivotally connected at its outer end with the lower end of a lever 273 fulcrumed at 274 on the block 192 and having a screw-pin 275 threaded at its upper end, the screw 275 bearing against a part of the block and holding the plate 270 against the side of the formed strip 72 with the desired pressure.

Figure 13:
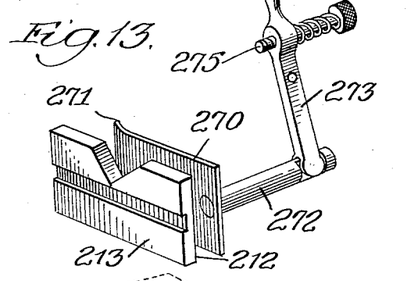
Figure 13 is a perspective view of certain details of the mechanism for holding the strip against lateral displacement in the cutting operation.

As will be understood, the cutter 189, in performing the cutting operation, shifts the severed end of the strip-section to the left in Fig. 13 beyond the path of movement of the strip 72, from which the strip-section was cut, and as a means for holding the strip-section in the displaced position referred to and thus out of the path of movement of the terminal end of the continuous strip 72 as it is fed through the machine, a dog 276 which locks the strip out of such path, is provided. This dog is in the form of a lever pivoted at 277 to the block 192 and bearing by gravity upon the top of the strip 72 as the latter is advanced beneath it by the operation of the machine. When the cutter shifts the strip section, as stated, this dog drops down in front of the severed strip-section and holds it out of the path of movement of the advancing strip which latter, at its upper surface, engages the dog and lifts it so that when the next strip section is cut, this dog drops in front of this section, the movements just described continuing throughout the continued operation of the machine.

The strip-section-stacking mechanism 31 comprises the table top 263 upon the top of which a follower device 278 is mounted to extend parallel with the path of movement of the continuous formed strip 72 through the machine. The follower 278 is connected at 279 with the upper reaches of sprocket chains 280 and 281 which engage sprockets 282 and 283 carried by stub shafts 284 and 285 journaled on the table top, which latter is slotted to receive the upper reaches of the chains, as represented at one portion thereof at 286. The chains also engage sprockets 287 and 288, respectively, rigidly secured to a shaft 289 journaled on a stationary part of the machine below the table top.

Figure 14:
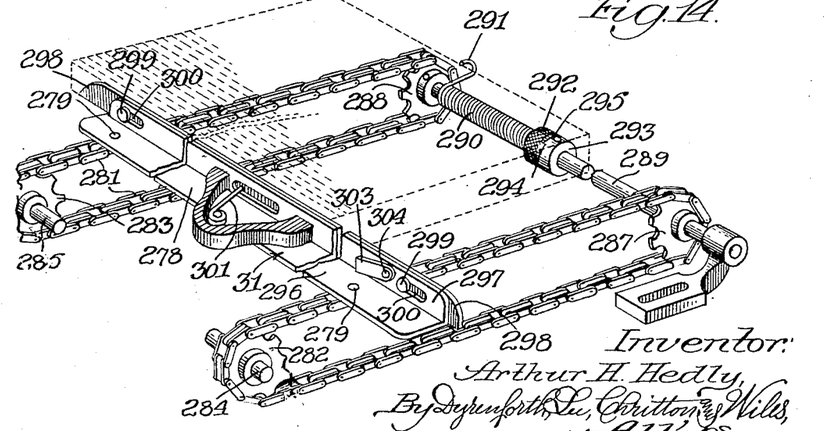
Figure 14 is a perspective view, with certain parts broken away, of the strip-section stacking mechanism.

The follower 278 is yieldingly urged toward the molded strip 72 by a coil spring 290 encircling the shaft 289, the end 291 of this coil spring being secured to a stationary part of the machine and its other end operatively connected with the shaft 289 and serving to rotate this shaft in clockwise direction in Fig. 14. To provide for the adjustment of the tension of the spring 290, the end thereof opposite the end 291 is connected with a collar 292 rotatably and slidably mounted on the shaft 289 and having releasable clutch engagement with a collar 293 rigid on the shaft 289, this clutching engagement being provided by a lug 294 on the collar 292 which normally extends into a slot 295 in the collar 293.

The follower 278 thus being positioned opposite the strip sections as the latter are produced by the operations of the cutting mechanism, these sections, represented at 72$^a$, are caused to be stacked on the table top 263, as shown in Fig. 5, the follower 278 receding in opposition to the action of the spring 290 as the stack of sections increased.

The particular illustrated construction of follower 278 comprises a main body portion 296 of angle shape in cross section at which the follower is attached to the chains 280 and 281. Extending along the upwardly-extending flange-portion 297 of the part 296, and adjustable therealong, is a strip 298 having rearwardly-extending headed studs 299 which project at their reduced portions through elongated slots 300 in the flange 297, thus permitting of the shifting of the strip 298 lengthwise of the machine, whereby the follower may be conditioned for operating in the most desirable way for the stacking of strip-sections of greatly varying lengths. For the shorter lengths of strip-sections, the strip 298 is preferably adjusted to the position shown in Fig. 14. For the longer strip-sections, it is preferably shifted to the right in this figure. A coil spring 301 carried by the body portion 296 and extending through a slot 302 in the flange 297 and engaging at its free end with the strip 298, tends to yieldingly hold the latter in the position shown in the drawings. The shifting of the strip 298 to the right in this figure is against the tension of the spring 301, the strip being held in such shifted position by swinging a dog 303 pivoted at 304 on the flange 298, into a position to engage, and for a stop for, the adjacent stud 299.

As will be understood from the foregoing description, the drive for all of the positively driven parts of the machine is through the drive shaft 85, this shaft being shown as driven by an electric motor 305 shown as mounted on the frame of the machine and driving a belt 306 engaging a pulley 307 rigid with a pinion 308 meshing with a gear 309 keyed to the drive shaft 85.

While I have illustrated and described a particular construction embodying my invention I do not wish to be understood as intending to limit it thereto as the same may be variously modified and altered without departing from the spirit of my invention.

What I claim as new, and desire to secure by Letters Patent, is:

1. In a machine of the character described, the combination of means for intermittently advancing a strip to be cut, means for severing the strip comprising cooperating mechanisms normally out of cooperating relationship and operable into cooperative relationship through the medium of the advancing strip, and means actuated by said first-named means for restoring said mechanism to normally inoperative relationship.

2. In a machine of the character described, the combination of means for intermittently advancing a strip to be cut, and means for severing the strip comprising a cutter, a cutter-actuating element, means for actuating said element, said cutter and actuating element being relatively movable into and out of a position in which they cooperate and in normal position being out of cooperating relationship, and means movable through the medium of said strip for causing said cutter and actuating element to be in cooperative relationship.

3. In a machine of the character described, the combination of means for intermittently advancing a strip to be cut, and means for severing the strip comprising a cutter, a cutter-actuating element, means for actuating said element in alternation with the feeding movements of said first-named means, said cutter and actuating element being relatively movable into and out of a position in which they cooperate and in normal position being out of cooperative relationship, and means movable through the medium of said strip for causing said cutter and actuating element to be in cooperative relationship.

4. In a machine of the character described, the combination of means for intermittently advancing a strip to be cut, and means for severing the strip comprising a cutter, a cutter-actuating element, means for actuating said element, said cutter and actuating element being normally out of cooperative relationship, and means movable through the medium of said strip for moving said cutter into a position to be actuated by said element.

5. In a machine of the character described, the combination of means for intermittently advancing a strip to be cut, and means for severing the strip comprising a cutter, a cutter-actuating element, means for actuating said element, said cutter and actuating element being normally out of cooperative relationship, said cutter being movable through the medium of said strip into a position to be actuated by said element, and means actuated by said first-named means for returning said cutter to a position in which it is out of cooperating relationship to said actuating element.

6. In a machine of the character described, the combination of means for intermittently advancing a strip to be cut, and means for severing the strip comprising a cutter, a cutter-actuating element, means for actuating said element, said cutter and actuating element being normally out of cooperative relationship and relatively movable into cooperative relationship, a device for causing said cutter and element to be in cooperative relationship in which said cutter is actuated by said element formed of relatively longitudinally movable sections and a spring connecting said sections together, one of said sections having a portion engageable by, and movable by, said strip and another of said sections being operatively engaged with the movable one of the parts comprised of said cutter and cutter actuating element.

7. In a machine of the character described, the combination of means for intermittently advancing a strip to be cut, and means for severing the strip comprising a cutter, a cutter-actuating element, means for actuating said element, said cutter and actuating element being normally out of cooperative relationship, a device for moving said cutter into a position to be actuated by said element formed of relatively longitudinally movable sections and a spring connecting said sections together, one of said sections having a portion engageable by, and movable by, said strip and another of said sections being operatively engaged with said cutter.

8. In a machine of the character described, the combination of means for intermittently advancing a strip to be cut, and means for severing the strip comprising a cutter, a cutter-actuating element, means for actuating said element, said cutter and actuating element being normally out of cooperative relationship, a device for causing said cutter and element to be in cooperative relationship in which said cutter is actuated by said element formed of relatively longitudinally movable sections and a spring connecting said sections together, one of said sections having a portion engageable by, and movable by, said strip and another of said sections being engaged with said first-named means.

9. In a machine of the character described, the combination of means for intermittently advancing a strip to be cut, and means for severing the strip comprising a cutter, a cutter-actuating element, means for actuating said element, said cutter and actuating element being normally out of cooperative relationship, a device for moving said cutter into a position to be actuated by said element formed of relatively longitudinally movable sections, and a spring connecting said sections together, one of said sections having a portion engageable by, and movable by, said strip and the other of said sections being operatively engaged with said first-named means.

10. In a machine of the character described, the combination of means for intermittently advancing a strip to be cut, means for severing the strip comprising a cutter, a cutter-actuating element, means for actuating said element, said cutter and actuating element being normally out of cooperative relationship and relatively movable into cooperative relationship, and a device for causing said cutter and element to be in cooperative relationship in which said cutter is actuated by said element formed of relatively longitudinally movable sections, and a spring connecting said sections together, one of said sections having a portion engageable by, and movable by, said strip and another of said sections being operatively engaged with the movable one of the parts comprised of said cutter and cutter actuating element, and a lost-motion connection between said first-named means and the last-referred-to one of said sections, for the purpose set forth.

11. In a machine of the character described, the combination of means for intermittently advancing a strip to be cut, means for severing the strip comprising a cutter, a cutter-actuating element, means for actuating said element, said cutter and actuating element being normally out of cooperative relationship, a device for moving said cutter into a position to be actuated by said element formed of relatively longitudinally movable sections and a spring connecting said sections together, one of said sections having a portion engageable by, and movable by, said strip and another of said sections being operatively engaged with said cutter, and a lost-motion connection between said first-named means and the one of said sections which engages said cutter.

12. In a machine of the character described, the combination of means for intermittently advancing a strip to be cut, and strip-severing means the operation of which is controlled by said strip comprising a reciprocable rod having a series of notches therealong, a tappet-device adjustable along said rod and with which said strip engages, said device comprising sections relatively adjustable along said rod and with one of which said strip engages, a nut confined on said last-referred-to section and having threaded engagement with the other section, and a releasable pawl on said last-referred-to section for entering said notches.

ARTHUR H. HEDLY.